United States Patent Office 2,770,550
Patented Nov. 13, 1956

2,770,550

MEAT-CURING SALT COMPOSITION

Lloyd A. Hall and Carroll L. Griffith, Chicago, Ill., assignors to The Griffith Laboratories, Inc., Chicago, Ill., a corporation of Illinois No Drawing. Application July 1, 1955,
Serial No. 519,614

14 Claims. (Cl. 99—222)

The present invention relates to curing salt compositions, and more particularly to the production of an improved composition of sodium chloride crystals housing alkali metal salt of either one or both of nitric acid and nitrous acid, and especially to a non-caking composition.

The flash-drying of a solution of sodium chloride containing alkali metal nitrite or alkali metal nitrate, or both, to form sodium chloride crystals housing said other salt as heart-like centers, is fully described in U. S. patents to Griffith No. 2,054,624 and No. 2,054,626, and to Hall No. 2,145,417, No. 2,668,770 and No. 2,668,771.

The basic composition is first described in the said Griffith patents wherein it is disclosed that such crystals may be formed by flash-drying, as on heated rolls, a strong solution of sodium chloride containing a minor proportion of the nitrogen-containing meat-curing salts. The resulting crystals have the characteristic cubic form of sodium chloride crystals, but under the microscope there may be seen within them heart-like centers which are the nitrogen-containing curing salt. It is also disclosed that the rapid crystallization produces an unstable mass of crystals including a very small quantity of water which is gradually decreased or increased according to equilibrium content with the environment. As formed, the environment is very humid so that the initial change is release of moisture. This takes place in the drums in which the material is stored, and as a result, the mass tends to cake on standing after the initial packaging.

The process and the character of the crystals are more scientifically expounded in the publication of Clark and Hall, Industrial and Engineering Chemistry, vol. 33, p. 98 (1941). As shown in said publication, all of the curing salt is included when the amount is small, and the included amount varies somewhat with the proportions in which the nitrite salt and nitrate salt are present. The following illustrates:

*Table I*

| Percent $NaNO_2$ | Percent $NaNO_3$ | Percent NaCl | Percent Inclusion |
|---|---|---|---|
| 4 | 6 | 90 | 100 |
| 6 | 4 | 90 | 100 |
| 8 | 6 | 86 | 100 |
| 8 | 10 | 82 | 100 |
| 12 | 8 | 80 | 100 |
| 8 | 12 | 80 | 80 |
| 12 | 8 | 80 | 80 |
| 16 | 12 | 72 | 70 |
| 18 | 12 | 70 | 70 |
| 6 | 20 | 74 | 66.6 |

Since these crystals are manufactured and variously stored before use in the meat-packing industry, it has been a commercial disadvantage that the product gradually cakes in the shipping container. Numerous expedients have been tried to prevent the caking, but only to a degree has it been minimized, as evidenced by prolonging the time until caking occurs. One of the earliest methods of minimizing the caking is described in the Griffith patents wherein a hygroscopic agent is added, such as corn sugar or glycerine, which is believed to take up the water as it is released from the crystals, and preferentially to take it up from the atmosphere, and thus provide an aqueous partition betwen the crystals.

It has been established that the caking is due in part at least to the initial liberation of water from the crystals, and not wholly from the absorption of moisture from the atmosphere, which commonly is the cause of caking in many salt compositions.

The above-cited patents all disclose the problem of caking and various ways to minimize it. Hall No. 2,145,417, for example, teaches that when commercial corn sugar is used, with or without glycerine, as a hygroscopic agent, the caking is minimized, but that the nitrite value is lowered on aging. Because of a trace of acidity in commercial corn sugar, Hall stabilized the composition with respect to nitrite by adding a buffering agent to insure a pH value not below 7.4. Sodium carbonate, sodium bicarbonate and disodium phosphate in very small amounts are named as suitable buffering agents. A pH of the solution above 7.4 and upwardly to values as high as 10.3 does not affect the quality of the solution to form jacketed crystals, nor does it operate to prevent caking.

The Hall Patents No. 2,668,770 and No. 2,668,771 also refer to the caking problem and disclose the use of hygroscopic agents to minimize it. The patents name specifically corn sugar, glycerine, sorbitol and propylene glycol. No. 2,668,770 describes the removal of hardness from the water employed in the process, by use of the ion-exchange procedures. Elimination of the hardness in no way minimizes the caking, and the product so produced still required the use of hygroscopic agent to minimize caking. Hall Patent No. 2,668,771 is based upon the discovery that traces of certain metallic cations function as oxidation catalysts leading to slow conversion of nitrite salt to nitrate salt, and to remedy this defect, the solution, normally containing such cations, is treated with a small but sequestering amount of polyphosphate salt, such as sodium tripolyphosphate, to capture such metal cations and render them ineffective as catalysts. This special treatment of the water in no way reduces the tendency to cake, nor eliminates the necessity to use hygroscopic agent.

Although various hygroscopic agents minimize rather than prevent the caking of the above-described compositions, it has not been found that the quantity of such agent may be increased within practical ranges to prevent caking. The present invention is based upon the discovery that the compositions containing the hygroscopic agent may be greatly improved and the caking may be further delayed and even prevented by the inclusion of a small quantity of a certain salt material present in the solution to be flash-dried.

It is, therefore, an object of the invention to make an improved curing salt composition of the type having sodium chloride crystals housing nitrogen-containing curing salt.

It is a particular object to minimize and even prevent the caking of such curing salt composition.

It is also an object to improve the physical character of the composition as originally formed and to retain that character in storage against change by caking.

In the various processes described in the above-cited patents, the flash-drying of the solution on heated rolls having a temperature in the range from 310° F. to 330° F., and preferably at 320° to 325° F., discharges a mass of powder-like crystals which are initially free flowing. It is a commercial necessity to package the material in drums for storage, shipment and then more storage. It has now been discovered that when alkaline alkali metal orthophosphate is present in a small amount in the solution to be flash-dried, the crystals are initially more powdery in character, and flow like water, with a greatly lessened or lost tendency to cake generally proportional to the amount of orthophosphate salt present. The resulting non-caking compositions retain the ability to flow like water.

Whether or not a composition cakes is a matter relative to time and also storage conditions. Initially, the composition is a mass of free-flowing crystals. The prior art compositions, even though minimized in the tendency to cake by inclusion of a hydroscopic agent, have caked as early as two weeks. A suitable commercial composition should be non-caking during the period from manufacture to consumption of the contents of a container in which it is shipped.

The compositions may be varied for different conditions. For example, when the drums are to be stored in a warehouse, the composition should remain free-flowing during the storage period. When drums are not stored in a warehouse, the composition is usually consumed in from 30 to 60 days after manufacture, and as a safety factor should be free-flowing for at least 90 days. Also, there are consumers located close to the place of manufacture who use the product within a much shorter time following manufacture.

The alkaline alkali metal orthophosphates are either potassium or sodium, and, in the case of the sodium salts, the ingredients referred to herein are trisodium phosphate monohydrate and disodium phosphate dihydrate. These have, respectively, molecular weights of 182 and 178. In consequence, the specification of amounts of percentages by one figure applies to both types of salt calculated as said crystal-form ingredients. No difference in result appears when using the potassium salts over using the sodium salts, and this is believed to be due to the predominance of sodium ions in the solution to be flash-dried. This seems to predetermine a predominance of the sodium orthophosphate salts in the final product.

In accordance with the present invention, the amount of alkaline alkali metal orthophosphate included in the composition is varied in accordance with the expected conditions of storage before consumption. In general, it has been found that the inclusion of said sodium salt ingredients in amount upwardly from 2% adds greatly to the non-caking life of the composition otherwise containing hygroscopic agent. Amounts of said sodium salt ingredient up to 5% of the salt composition have been used with good results, but not over 3% is required for present-day commercial practices. For the average user, amounts in the range from 2% to 5% are suitable and are preferred, but it is to be understood that the invention contemplates using any amount above 2% which adds to the non-caking life of a composition otherwise without it. When the anti-caking agents in a composition consist of a hygroscopic agent and alkaline alkali metal orthophosphate, the invention contemplates that the latter be present in amount at least equivalent to 2% calculated as said sodium salt ingredients. In the absence of the hygroscopic agent, the same amounts of the alkaline alkali metal orthophosphate are not effective, leading to the conclusion that the hygroscopic agent and the salt are synergistic.

In a co-filed application Serial No. 519,616 of Hall and Kalchbrenner, it is shown that alkali metal citrate is an effective anti-caking agent in combination with the hygroscopic agent. In another co-filed application Serial No 519,615 of Hall and Kalchbrenner, sodium citrate is used in combination with alkaline alkali metal orthophosphate. In particular therein, citric acid and trisodium orthophosphate monohydrate may be the initial ingredients, so used that they react to form sodium citrate and disodium orthophosphate, with or without any excess of the trisodium phosphate.

The present invention as practiced with trisodium phosphate alone gives better results than with an equal amount of disodium phosphate used alone. However, when the solid curing salt composition is dissolved in tap water to make a pickling brine, there is cloudiness from the formation of insoluble phosphates from the mineral hardness in the water. The cloudiness is more prominent in the case of trisodium phosphate. Consumers are accustomed to clear brine, so when it is desired to overcome the cloudiness a small amount, such as 1% of the whole, of sodium tripolyphosphate is included to sequester the mineral hardness. Sodium tripolyphosphate per se does not function like the orthophosphate salts of the present invention. Sodium tripolyphosphate to avoid cloudiness may be replaced by sodium citrate, which adds to the anti-caking function as set forth in said co-filed application Serial No. 519,615. Accordingly, the present invention is directed to the use of alkaline alkali metal orthophosphates as anti-caking agents with or without sequestering agents such as sodium tripolyphosphate and sodium citrate.

In carrying out the invention, the various compositions known and commercially made need not be changed except by the addition of the salts as stated above in substitution for part of the sodium chloride. The selected salt may be either dissolved as an ingredient in the solution which is to be flash-dried, or it may be formed from suitable reactants in the final solution or in the course of forming the final solution. In forming the final solution, any one or more of the various alkaline agents used in making the solution should be present in quantity to give a desirable pH of at least 7.4 to assure retention of nitrate value.

The invention is illustrated by variations in two basic compositions of which the salt ingredients and the proportions thereof to each other are well established in commercial use. These are shown in Table II.

*Table II*

[Parts in Pounds]

|  | Formula | |
| --- | --- | --- |
|  | No. 1 | No. 2 |
| Sodium Nitrite | 173 | 342 |
| Sodium Nitrate | 116 | 231 |
| Sodium Chloride [1] | 2,479 | 2,195 |
| Sodium Tripolyphosphate | 0.25 | 0.25 |
| Glycerine | 14 | 14 |
| Water (900 gallons) | | |

[1] The amount given is decreased by the amount of material added in the examples below.

In the following examples, a heated solution containing the various salt incredients is run onto slowly revolving drums heated to a temperature in the range from 310° F. to 330° F. Powdery crystals are scraped from the rolls and conveyed by worm-screw through a cooling tunnel and packed into drums holding about 300 pounds, with the crystals at or below room temperature.

No absolute measure of the desired effect has been found, and only a general estimate from numerous batches has been made. Temperature and humidity differences at the time of manufacture, and also during the storage period, are influential, and in the absence of controlled surroundings, exact values are difficult to secure.

The following Table IIII gives the data as follows:

Column 1: Example number.
Column 2: Formula of Table II.
Column 3: Quantity of orthophosphate salt.
Column 4: Quantity of agent for sequestering.
Column 5: Percent content of tri-or di- (see footnote of table).
Column 6: Percent content of agent for sequestering.
Column 7: Comment on non-caking life.

Table III

| Example | Formula | Oz. of— | Oz. of— | Percent | Percent | Comment |
|---|---|---|---|---|---|---|
| 1 | 1 | 2226 Tri-[1] | | 5 | 0 | 6 months. |
| 2 | 1 | 2226 Tri- | 432 STP[3] | 5 | 1 | 7 months. |
| 3 | 1 | 2226 Tri- | 660 NaCit[4] | 5 | 1 | Do. |
| 4 | 1 | 2226 Tri- | 432 Cit[5] | 5 | 1 | Do. |
| 5 | 1 | 1336 Tri- | | 3 | 0 | 5 months. |
| 6 | 1 | 1336 Tri- | 432 STP | 3 | 1 | Do. |
| 7 | 1 | 1336 Tri- | 660 NaCit | 3 | 1 | Do. |
| 8 | 1 | 1336 Tri- | 432 Cit | 3 | 1 | Do. |
| 9 | 1 | 890 Tri- | | 2 | 0 | 4 months. |
| 10 | 1 | 890 Tri- | 432 STP | 2 | 1 | Do. |
| 11 | 1 | 890 Tri- | 660 NaCit | 2 | 1 | Do. |
| 12 | 1 | 2226 Di-[2] | | 5 | 0 | 5 months. |
| 13 | 1 | 1336 Di- | | 3 | 0 | 4 months. |
| 14 | 1 | 1336 Di- | 432 STP | 3 | 1 | Do. |
| 15 | 1 | 1336 Di- | 660 NaCit | 3 | 1 | Do. |
| 16 | 1 | 890 Di- | | 2 | 0 | 3 months. |
| 17 | 1 | 890 Di- | 432 STP | 2 | 1 | 4 months. |
| 18 | 1 | 890 Di- | 660 NaCit | 2 | 1 | Do. |
| Control | 1 | | | | | 2 weeks. |
| Do | 2 | | | | | Do. |

[1] Tri-=$Na_3PO_4 \cdot H_2O$
[2] Di-=$Na_2HPO_4 \cdot 2H_2O$
[3] STP=Anhydrous sodium tripolyphosphate
[4] NaCit=Sodium citrate dihydrate (m. w.=294)
[5] Cit=Anhydrous citric acid (m. w.=192)

When the examples of Tables III are repeated using Formula No. 2 of Table II, anti-caking life is the same as indicated in Table III.

In the foregoing examples, the glycerine as the hygroscopic agent may be replaced in whole or in part by an equal weight of either corn sugar, or propylene glycol or sorbitol, or a mixture of such agents, with substantially the same results as described. The hygroscopic agent has anti-caking properties only to a degree such that increasing its content does not add to the effect. The presence of a small amount of alkaline alkali metal orthophosphate adds greatly to the effect of the hydgroscopic agent, but in the absence of the latter, it has little effect to minimize caking. Accordingly, the combination of the alkaline alkali metal orthophosphate and of hygroscopic agent is a synergistic one.

From the foregoing description and explanation, it will be apparent that the invention may be practiced with numerous variations not limited to the precise illustrations herein given, and such changes and modifications are contemplated as falling within the scope of the invention as expressed in the appended claims.

We claim:

1. A curing salt composition consisting of the flash-dried crystals of an aqueous solution having a pH not under 7.4 and having solute consisting essentially of a major portion of sodium chloride, a minor portion of curing salt selected from the group consisting of alkali metal nitrite, alkali metal nitrate, and mixtures thereof, and a small quantity of anti-caking material comprising a hygroscopic agent and alkaline alkali metal orthophosphate in amount in at least 2% of the composition, calculated as $Na_3PO_4 \cdot H_2O$.

2. The product of claim 1 wherein the alkaline orthophosphate salt is present in amount in the range from 2% to 5% of the composition, calculated as $Na_3PO_4 \cdot H_2O$.

3. The product of claim 1 in which all the salts are sodium salts.

4. The product of claim 1 in which there is present a small percentage of agent which sequesters mineral phosphates resulting from the mineral hardness of water in a meat-pickling brine containing the salt.

5. The product of claim 4 in which the sequestering agent is sodium tripolyphosphate.

6. The product of claim 1 in which the hygroscopic agent is glycerine.

7. The product of claim 2 in which the hygroscopic agent is glycerine.

8. The product of claim 3 in which the hygroscopic agent is glycerine.

9. The product of claim 4 in which the hygroscopic agent is glycerine.

10. The method which comprises forming a solution at a pH not under 7.4 consisting essentially of alkaline alkali metal orthophosphate, sodium chloride, hygroscopic material, and curing salt selected from the group consisting of alkali metal nitrite, alkali metal nitrate, and mixtures thereof, the curing salt being present in sufficiently small amount so that a major portion thereof will be jacketed by the sodium chloride in the hereinafter-mentioned flash-drying, and the said orthophosphate salt calculated as $Na_3PO_4 \cdot H_2O$ being present in amount upwardly from about 2% of the solid content of said solution, and flash-drying the said solution.

11. The method of claim 10 in which all the salts are sodium salts.

12. The method of claim 10 in which a small percentage of sodium tripolyphosphate is present in quantity to sequester mineral hardness of water in a meat-pickling brine containing the salt composition.

13. The method which comprises forming a solution at a pH not under 7.4 consisting essentially of alkaline alkali metal orthophosphate, sodium chloride, glycerine, and curing salt selected from the group consisting of alkali metal nitrite, alkali metal nitrate, and mixtures thereof, the curing salt being present in sufficiently small amount so that a major portion thereof will be jacketed by the sodium chloride in the hereinafter-mentioned flash-drying, and the said orthophosphate salt calculated as $Na_3PO_4 \cdot H_2O$ being present in amount upwardly from 2% of the solid content of said solution, and flash-drying the said solution.

14. The method which comprises forming a solution at a pH not under 7.4 consisting essentially of alkaline alkali metal orthophosphate, sodium chloride, glycerine, and curing salt consisting of sodium nitrite and sodium nitrate, the curing salt being present in sufficiently small amount so that a major portion thereof will be jacketed by the sodium chloride in the hereinafter-mentioned flash-drying, and the said orthophosphate salt calculated as $Na_3PO_4 \cdot H_2O$ being present in amount upwardly from 2% of the solid content of said solution, and flash-drying the said solution.

References Cited in the file of this patent

UNITED STATES PATENTS

| | | |
|---|---|---|
| 2,145,417 | Hall | Jan. 31, 1939 |
| 2,596,067 | Brissey | May 6, 1952 |
| 2,668,771 | Hall | Feb. 9, 1954 |